Patented Aug. 9, 1927.

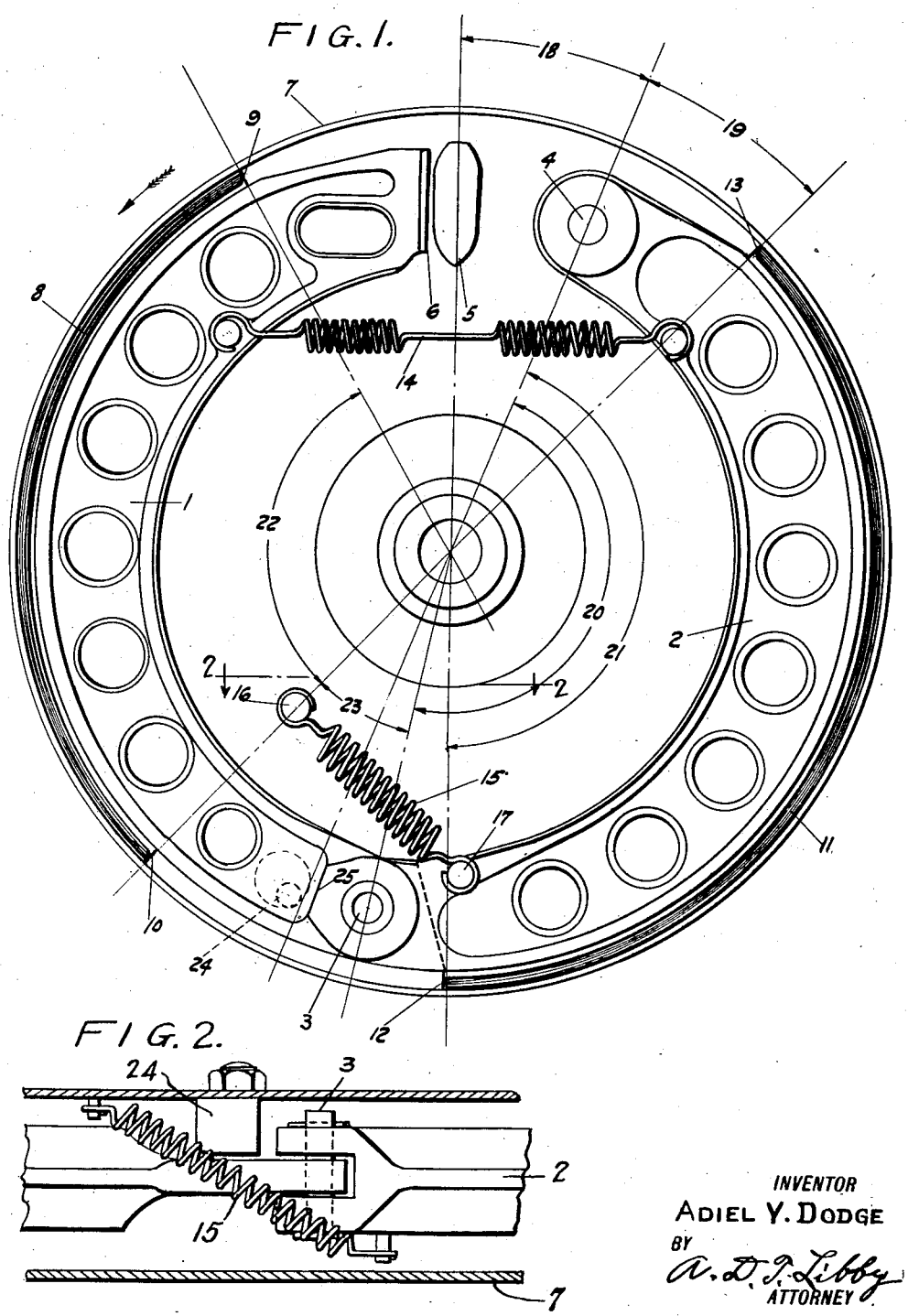

1,638,326

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed September 29, 1924. Serial No. 740,534.

This invention relates to improvements in internal expanding brakes of the self-energizing type.

As will be understood, each of the brake shoes is faced with friction wearing material generally referred to as brake lining.

One of the objects of my invention is to provide a disposition of this brake lining on the shoes of the type referred to so as to equalize the clearance at the four points of minimum clearance, which are at the extremities of the two segments of the brake lining. To attain this object, the several extremities of the brake shoes, the anchorage therefor, and the articulated joints must be placed in a certain angular relationship to get approximate equal clearance at the critical points for a given minimum movement of the brake actuating means.

A further ancillary object is to provide brakes having a more even distribution of wear on the lining and hence, a greater life.

Other objects, and features, including a novel arrangement of a positioning stop, which is preferably adjustable, a spring arranged to urge the shoe toward idle position and at the same time to position it laterally, and other new combinations of parts and desirable particular constructions, will appear from a study of the specification and annexed drawing in which, Figure 1 is a vertical section through the brake, just inside the head of the drum; and Figure 2 is a partial section through the brake on the line 2—2 of Figure 1, looking toward the connected ends of the shoes.

In the illustrated arrangement, 1, is the primary brake shoe, and 2, the secondary brake shoe joined or articulated to primary shoe 1 at the point 3, independently of any other support. The secondary shoe 2 is pivotally anchored at 4 to any suitable supporting means.

The brake actuating means is illustrated in the form of a cam 5 which is shown in its released position, while the brake shoes are shown in engagement with the drum 7. It will be understood, that when the cam 5 is actuated, this engages the face 6 on the primary shoe 1.

Primary shoe 1 carries a brake lining 8 terminating at points 9 and 10, while the shoe 2 has a lining 11 terminating at points 12 and 13. A spring 14 is connected between the two brake shoes and is for the purpose of releasing the shoe 1 and to a lesser degree the shoe 2 from the brake drum 7. The spring 15 is attached at 16 to a fixed member and the other end 17 to the secondary shoe 2 preferably close to the joint 3. This latter spring preferably lies in a plane diagonal to the plane of rotation of the brake drum and thereby acts as an anti-rattling device, since the tendency is to hold the joint 3 against the brake supporting means. 24 is an adjusting device in the form of an eccentric acting on the face 25 for assisting in positioning the brake shoes within the drum.

The brake herein described, is of a well known servo or self-energizing type, the action being briefly as follows:

When the brake actuating means, such as the cam 5, is moved to engage the face 6, the primary shoe 1 is forced against the brake drum 7. Due to the frictional action, the shoe 1 tends to rotate in the same direction as the brake drum which is indicated by the arrow in an anti-clockwise direction. This tendency of the shoe 1 to rotate is transmitted through the joint 3 to the secondary shoe 2 with the result that the reaction from the braking effect of shoe 1 is utilized to apply shoe 2 to the brake drum; hence, this type of brake is known as the self-energizing or servo brake. Since my invention relates particularly to securing the maximum action from this type of brake, I will now describe the details which serve to accomplish this maximum effect.

As shown in the drawing, the brake lining 8, on the shoe 1, is arranged between the points 9 and 10, while the lining 11 on shoe 2 extends between the points 12 and 13, and one of the problems is to position this brake lining on the shoes so as to equalize the clearance at these four points of minimum clearance in order to get the most uniform and efficient braking action. It will be obvious that from the point of view of clearance, it is desirable to maintain the anchorage 4 on the shoe 2 as near the periphery of the brake drum as is structurally possible, for this will result in maximum clearance at the point 13, for a minimum angular movement of the shoe 2 to the point 4. It is further obvious that the greater the angle designated 19, the greater the clearance at 13 for a given angular movement of shoe 2. This angle should be kept as low as possible as it adversely affects the arcuate length of the brake lining on the shoe 2. The end of the brake lining at 12 must lie in a position such that the angle designated at 21 is less than 180° and the joint 3 should be so positioned from the anchorage 4 that the angle designated 20 shall be less than 180°. The point 12 is thus fixed, for unless the angle 21 is less than 180°, the angular rotation of the shoe 2 in a clockwise direction, will not produce a clearance at the point 12 from the brake drum. Angle 20 should not be 180° or more, for the reason that if it were, the rotation of the shoe 2, in a clockwise direction, which is the direction for releasing said shoe from application, would result in a movement of point 10 toward the brake drum, thus decreasing the braking clearance on shoe 1 at point 10. This will result either in a nonfunctioning brake or in the necessity for a larger angular movement at the face 6 of the shoe 1 to obtain clearance for the shoe 1 at the point 10. On the other hand, if the angle 20 is greater than 180° the angular movement of shoe 1 required for a given clearance at point 9 is reduced, as the former angle is increased and consequently the linear movement of face 6 is also reduced. The problem is therefore to so position the anchorage and the joint between the shoes 1 and 2 and the brake actuating means with respect to each other, including the positioning of the brake lining on the shoes so that the clearance for a given movement of the brake actuating means 5, may be a maximum and approximately equal at the four points of minimum clearance, namely, 9, 10, 12, and 13. To accomplish the required result, I place the anchor point 4 close to the periphery of the brake drum with the angle 19 so laid out as to give a predetermined clearance for a given angular movement of shoe 2. With the same angular movement of shoe 2, the point 12 is then determined for the same clearance as for the point 13. The position of the joint 3 is so determined that for a minimum linear distance between the points 3 and 10, a maximum clearance may be obtained for the already determined angular movement of the shoe 1. Point 9 is then determined as that point which will give a maximum angle designated 22 for a predetermined clearance and a minimum movement of the face 6 of the brake shoe 1. In practise, the anchorage point 4 is fixed with as small an angle designated 18 from the brake actuating means as is allowed by structural limitations of the brake actuating means. Ordinarily, I find this approximately between 20 and 30°. The angle 19 may be varied approximately between 15° and 30° depending on the allowable limits of accuracy of the brake drum and brake shoe which limits determine the clearance required. The angle designated 21 is less than 180° by such amount as is necessary to give the predetermined clearance with the already fixed position of the anchor point 4. The angle 20 should be less than 180° or preferably more than 160° depending on the allowable movement of the face 6 which is again controlled by the method of brake actuation. In practise for normal brake actuation the angle 20 should preferably lie between 165 and 175°. Angle designated 23 is set from the already fixed points to give the necessary clearance as is angle 22.

It will be appreciated that my invention is susceptible of certain changes without departing from the spirit of the same and the scope of the appended claims.

Having thus described my invention, what I claim is:

1. In a self-energizing brake mechanism comprising; a shoe having an anchorage and a second shoe jointed only to the first shoe and having its free end adapted to be acted on by an operating member, each of said shoes carrying friction material; means for obtaining substantially equal clearance on both shoes at the extremities of said friction material; consisting of making the angular distance from said anchorage point to said shoe joint less than 180° and spacing the friction material on the shoe so that the angle designated 19 may vary from approximately 15 to 30° and the angle designated 21 shall be less than 180° by an amount necessary to give a predetermined clearance with relation to the chosen anchor point; angles designated 22 and 23 being determined to give a predetermined clearance with a minimum movement of the free end of the primary shoe.

2. In a self-energizing brake mechanism comprising; a shoe having an anchorage and a second shoe jointed only to the first shoe and having its free end adapted to be acted on by an operating member, each of said shoes carrying friction material; means for obtaining substantially equal clearance on both shoes at the extremities of said friction material; consisting of making the angular distance from said anchorage point to said shoe joint less than 180°, said anchor point center being arcuately spaced from the axial center of said operating means according to the angle designated 18 and varying from approximately 20 to 30° and spacing the friction material on the shoes so that the angle designated 19 may vary from approximately 15 to 30° and the angle designated 21 shall be less than 180° by an amount necessary to give a predetermined clearance with relation to the chosen anchor point, angles designated 22 and 23 being then determined to give a predetermined clearance with a minimum movement of the free end of the primary shoe.

3. In a self-energizing brake mechanism comprising; a shoe having an anchorage and a second shoe jointed only to the first shoe and having its free end adapted to be acted on by an operating member, each of said shoes carrying friction material; means for obtaining substantially equal clearance on both shoes at the extremities of said friction material, consisting of making the angular distance from said anchorage point to said shoe joint less than 180° and greater than 160°, preferably within the range of 165 to 175° and spacing the friction material on the shoes so that the angle designated 19 may vary from approximately 15 to 30° and the angle designated 21 shall be less than the angle between the anchor point and the articulated joint, angles designated 22 and 23 being determined to give a predetermined clearance with a minimum movement of the free end of the primary shoe.

4. A brake comprising, in combination, a drum, a first shoe anchored at one end within the drum and extending less than 180°, a stop arranged at the opposite end of the shoe, a spring urging the shoe toward a position determined by the stop, a second shoe pivotally connected to the unanchored end of the first shoe, and means for swinging the second shoe against the drum while the anchored shoe is held by the spring in the position determined by the stop.

5. A brake comprising, in combination, a drum, a first shoe anchored at one end within the drum and extending less than 180°, an eccentric stop engaging the opposite end of the shoe, a spring connected to said shoe adjacent the stop and urging the shoe against the stop, a second shoe pivotally connected to the unanchored end of the first shoe, and means for swinging the second shoe against the drum while the first shoe is held by the spring against the stop.

6. A brake comprising, in combination, a drum, a shoe anchored within the drum and extending less than 180°, another shoe connected to the unanchored end of the first shoe, a stop engaging one of the shoes to determine its idle position radially of the drum, brake-supporting means, and a spring connected to one of the shoes and urging it laterally against the brake-supporting means.

7. A brake comprising, in combination, a drum, a shoe anchored within the drum and extending less than 180°, another shoe connected to the unanchored end of the first shoe, a stop engaging one of the shoes to determine its idle position radially of the drum, brake-supporting means, and a diagonal spring connected to one of the shoes and urging it against the stop and laterally against the brake-supporting means.

8. A brake comprising, in combination, a drum, a shoe anchored at one end within the drum and extending less than 180°, a brake-supporting means, a stop carried by said means and determining the idle position of the unanchored end of said shoe, another shoe arranged at the end of the first shoe, a pivot joint connecting the shoes, and a spring connected to one of the shoes adjacent the joint and extending diagonally to the brake-supporting means and urging the first shoe against the stop and urging said joint toward said means to position the shoes laterally.

In testimony whereof, I affix my signature.
ADIEL Y. DODGE.